United States Patent [19]
Ito et al.

[11] Patent Number: 5,269,399
[45] Date of Patent: Dec. 14, 1993

[54] DEVICE FOR TRANSMITTING DRIVING FORCE

[75] Inventors: Kenichiro Ito; Hiromi Nojiri; Kenro Adachi, all of Shizuoka, Japan

[73] Assignee: NTN Corporation, Osaka, Japan

[21] Appl. No.: 874,882

[22] Filed: Apr. 27, 1992

[30] Foreign Application Priority Data

Apr. 30, 1991 [JP] Japan .................. 3-098847

[51] Int. Cl.⁵ .................. F16D 15/00; F16D 43/20; F16H 37/06
[52] U.S. Cl. .................. 192/45.1; 192/38; 180/76; 180/248; 464/140; 464/146; 475/222
[58] Field of Search ............ 192/45.1, 43.1, 38, 192/37; 180/248, 76; 464/30, 113, 140, 146, 906; 475/222, 230

[56] References Cited

U.S. PATENT DOCUMENTS

| | | | |
|---|---|---|---|
| 4,132,297 | 1/1979 | Brown et al. | 180/248 X |
| 4,799,402 | 1/1989 | Van Dest | 475/222 X |
| 4,901,831 | 2/1990 | Ito et al. | 192/38 |
| 5,016,740 | 5/1991 | Ito et al. | 192/38 |
| 5,041,069 | 8/1991 | Horst | 475/222 X |
| 5,131,285 | 7/1992 | Weismann et al. | 192/38 X |
| 5,135,084 | 8/1992 | Ito et al. | 192/45.1 X |

*Primary Examiner*—Leslie A. Braun
*Assistant Examiner*—Andrea Pitts
*Attorney, Agent, or Firm*—Nikaido, Marmelstein, Murray & Oram

[57] ABSTRACT

A driving force transmission device for a vehicle has a homokinetic joint having an outer ring and a clutch device having an outer ring coupled to the outer ring of the homokinetic joint. An input shaft is rotatably inserted in the outer rings. A cage is rotatably mounted between opposed surfaces of the outer rings and the input shaft. The cage has pockets. Engaging elements are mounted in the pockets. They are adapted to engage the opposed surfaces when the input shaft and the cage rotate relative to each other either clockwise or counterclockwise. Elastic members are mounted in the pockets to keep the engaging elements in a not-engaged position. The cage and the input shaft are coupled together with a gap extending in the direction of rotation formed therebetween so as to be rotatable together. A differential member are mounted on the cage or the input shaft to produce a difference in rotation therebetween.

2 Claims, 7 Drawing Sheets

DEVICE FOR TRANSMITTING DRIVING FORCE

BACKGROUND OF THE INVENTION

This invention relates to a device for transmitting driving force to vehicle wheels.

If a vehicle turns a tight corner with the four wheels coupled together, the front wheels tend to turn faster and slip due to a difference in turning radius between the front and rear wheels. As a result, the car behaves as though it is braked.

In order to prevent such braking phenomena, conventional four-wheel drive vehicles are equipped with a center differentials separately from differentials for front and rear wheel to absorb differences in rotation between the front and rear wheels. Such a center differential has a mechanical structure comprising gears meshing with each other. This differential has a problem that if one of the wheels should lose grip of the road surface and fall into an unloaded state, the driving force is transmitted only to this wheel while no driving force is transmitted to the other wheels normally gripping the road surface.

In order to cope with this problem, recently developed center differentials have both the differential function for absorbing any difference in rotation between the front and rear wheels and the function of limiting the differential function. It is proposed to combine such differentials with viscous coupling which utilizes the shearing force of a high-viscosity material or a coupling which utilizes friction between a multiple disc clutch and an elastic member.

But these couplings require an extremely large number of parts. This will complicate the structure of the driving system of the car and push up the cost.

Also, since the driving force is transmitted making use of a speed difference between the input and output, no large driving force can be transmitted while this speed difference is small. In order to transmit a sufficiently large driving force, the speed difference has to be considerably larger. Thus, the responsiveness and efficiency of power transmission are low.

An object of this invention is to provide a transmission device for transmitting driving force which has a simple mechanical structure, which can transmit the driving force efficiently, and which makes full-time four-wheel drive possible without using a center differential when mounted between vehicle wheels and their differentials.

SUMMARY OF THE INVENTION

In order to solve the above problems, this invention provides a driving force transmission device for a vehicle comprising a homokinetic joint and a clutch means, the clutch means comprising an outer ring coupled to the homokinetic joint, an input shaft rotatably inserted in the outer rings, a cage rotatably mounted between opposed surfaces of the outer rings and the input shaft, the cage being formed with pockets, engaging elements mounted in the pockets and adapted to engage the opposed surfaces when the input shaft and the cage rotate relative to each other either clockwise or counterclockwise, elastic members mounted in the pockets and adapted to keep the engaging elements in a position where the engaging elements are not in engagement with the opposed surfaces, the cage and the input shaft being coupled together with a gap extending in the direction of rotation formed therebetween so as to be rotatable together, and a differential means mounted on one of the cage and the input shaft to produce a difference in rotation therebetween.

The outer ring of the homokinetic joint and the outer ring of the clutch device may be formed integral with each other.

The inner ring of the homokinetic joint is coupled to the axles of the front wheels and the input shaft is coupled to the differential. As the input shaft rotates, in the clutch device, the input shaft and the cage rotates relative to each other by a distance equal to the size of the gaps extending in the direction of rotation by the action of the differential means. The engaging elements thus move to the engaged operative position.

In this state, if the input shaft begins to rotate faster than the outer ring, the engaging elements will engage, thus allowing transmission of torque from the input shaft to the front wheels through the outer ring and the homokinetic joint.

In contrast, if the front wheels begin to rotate faster than the rear wheels while the car is turning a tight corner, the clutch device overruns, so that the front wheels rotate, separated from the rear wheels.

According to this invention, the engaging and overrunning function of the mechanical clutch is used to automatically engage and disengage the axles and the differential according to the difference in rotation therebetween. Simply by mounting this drive transmission device between the axles and the differential, it can perform both the function of absorbing revolving speed differences between the front and rear wheels and the differential limiting function. Thus, this device can achieve a full-time direct-coupled four-wheel drive without the need for a center differential.

Since the clutch is always kept in its engageable operative state, as soon as there appears even a slight difference in rotation between the axles and the differential due e.g. to slipping of the shaft, clutch engages instantly. Thus, the driving mode can be changed over with high responsiveness and powerful drive transmission becomes possible.

Other features and objects of the present invention will become apparent from the following description taken with reference to the accompanying drawings, in which:

DETAILED DESCRIPTION OF THE PREFERRED EMBODIMENT

Figure 5:
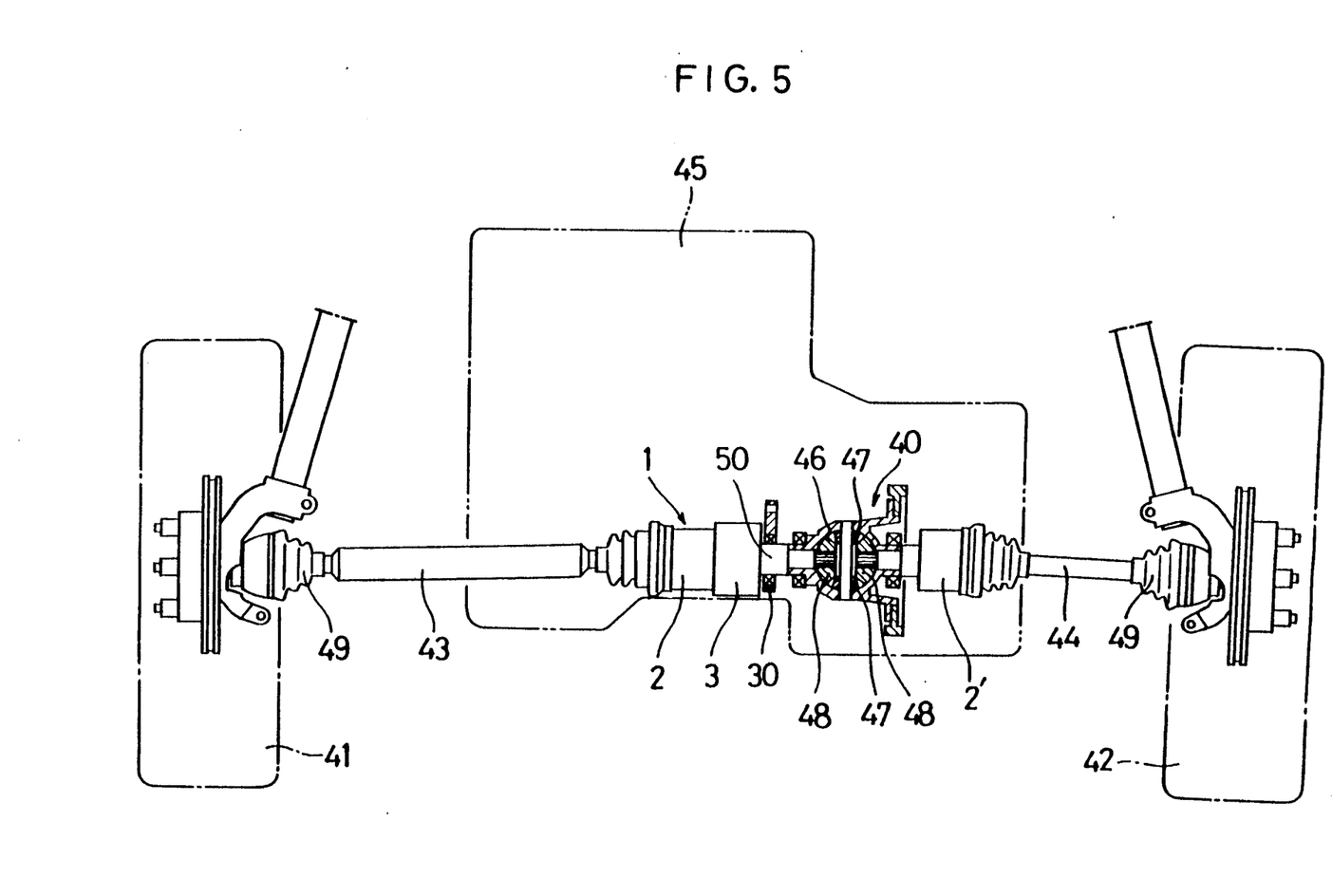
FIG. 5 is a partially vertical sectional front view of the same mounted on the driving system of a vehicle.
Figure 6:
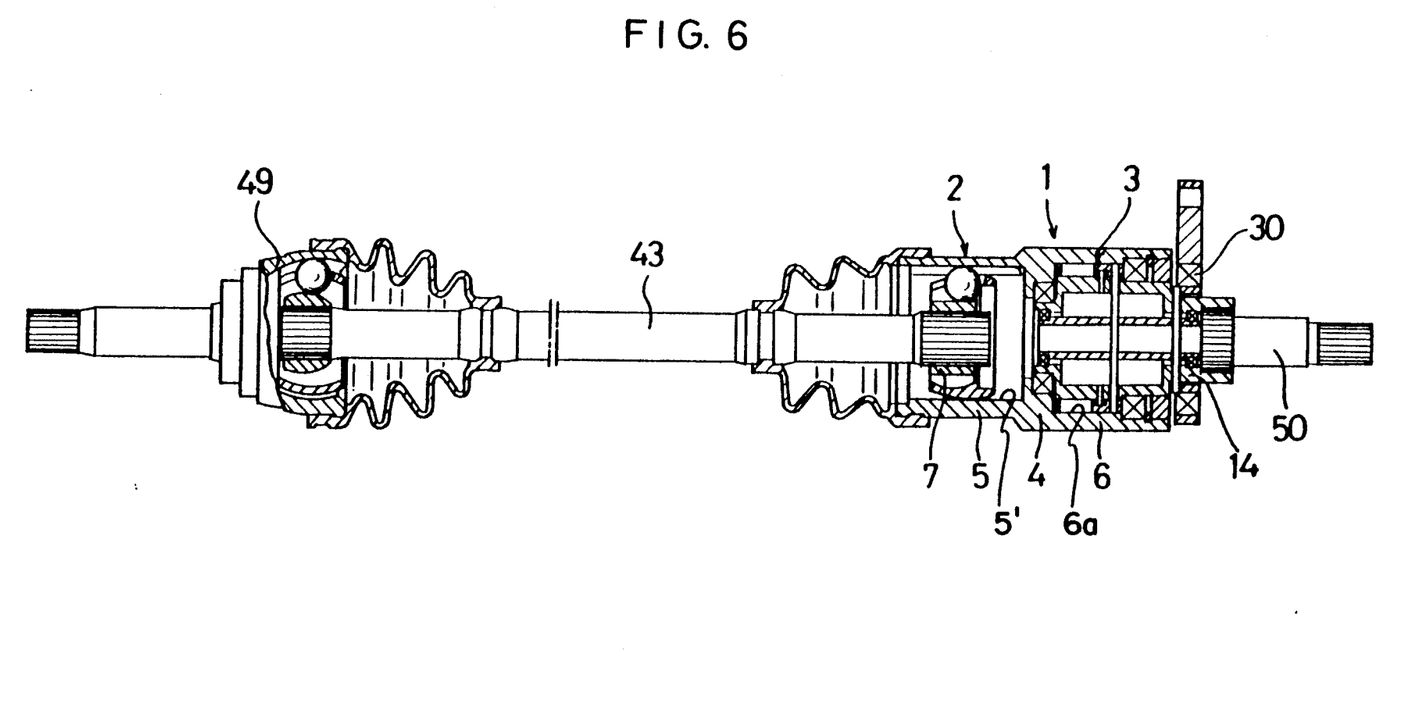
FIG. 6 is an enlarged partially vertical sectional front view of a portion of FIG. 5.

FIGS. 1–4 show the first embodiment of the driving power transmission device. FIGS. 5 and 6 show the device mounted on the driving system of a vehicle.

FIG. 5 shows a drive system for driving the front wheels of a four-wheel car in which a front differential 40 is coupled to right and left front wheels 41 and 42 through axles 43 and 44 having different lengths from each other. A driving power transmission device 1 of this embodiment is mounted on the longer axle 43.

The front differential 40 comprises a rotatable differential case 46 coupled to the transmission (not shown) of an engine 45, pinion gears 47 coupled to the case 46 so as to be rotatable together, and a pair of side gears 48 meshing with the pinion gears 47. The axles 43 and 44 are coupled to the side gears 48 through double offset type homokinetic joints 2 and 2'. The front wheels 41 and 42 are coupled to the respective axles 43 and 44 through type homokinetic joints 49 of a Rzeppa type.

Figure 1:
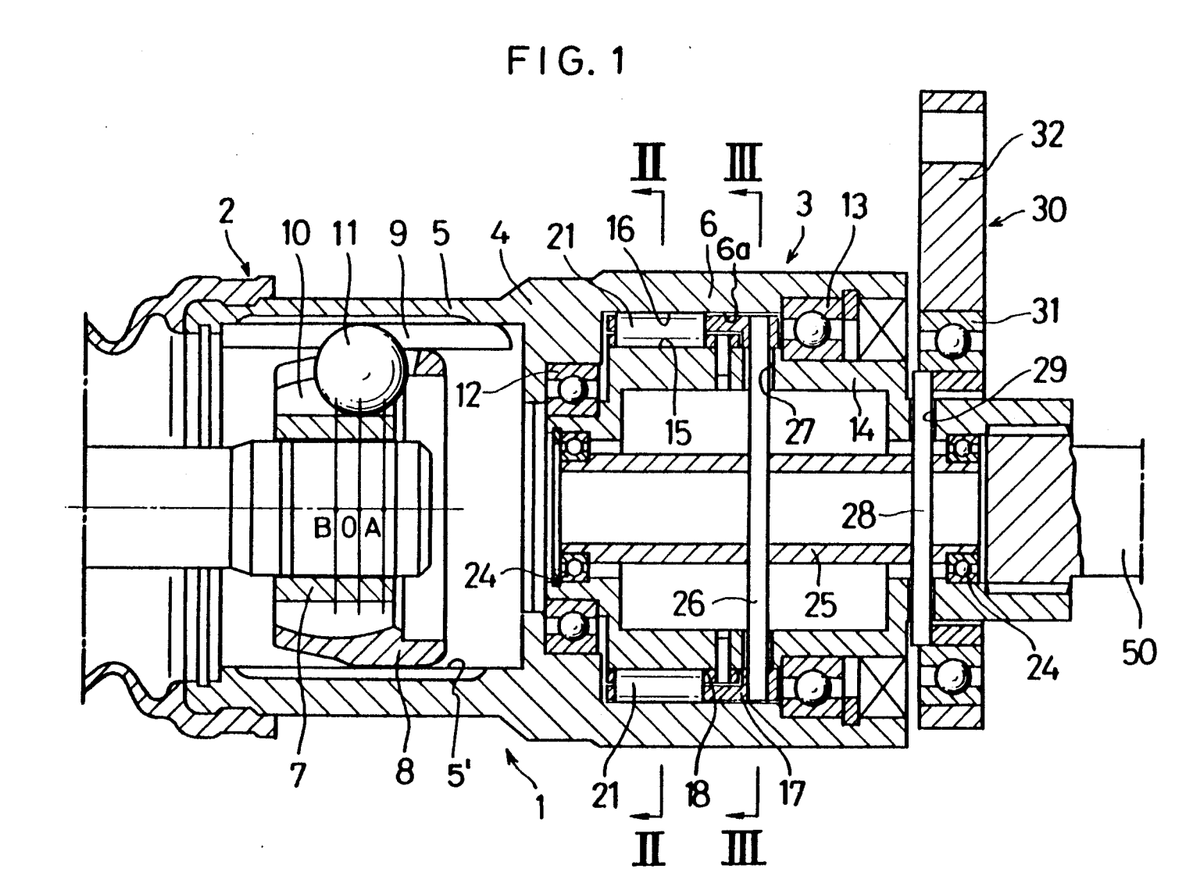
FIG. 1 is a vertical sectional front view of a first embodiment.

As shown in FIGS. 1 and 6, the driving power transmission device 1 of the first embodiment comprises the double offset type homokinetic joint 2 coupled to the longer axle 43 and a clutch device 3 with their outer rings integrally formed as a common sheath 4.

Namely, one end portion of the sheath 4 serves as an outer ring 5 of the homokinetic joint 2. An inner ring 7 coupled to the end of the axle 43 and a cage 8 is fitted in a cylindrical bore 5' in the outer ring 5. Ball track grooves 9 and 10 are formed in the inner peripheral surface of the outer ring 5 and in the outer peripheral surface of the inner ring 7, respectively. Balls 11 held by the cage 8 are received in the ball track grooves 9 and 10.

The centers A and B of outer and inner spherical surfaces of the cage 8 are offset by the same distance to both sides from the angular center O of the joint, which is located on the intersection of the center line of the ball pockets of the cage 8 with the axis of the outer or inner ring.

With this arrangement, the balls 11 are always kept by the cage 8 in a plane bisecting the inner and outer rings irrespective of the turning angle of the homokinetic joint 2. Also, the inner and outer rings can move axially with respect to each other in the joint.

On the other hand, the other end of the sheath 4 serves as an outer ring 6 of the clutch device 3. An input shaft 14 is rotatably inserted in a bore 6a in the outer ring 6 through bearings 12 and 13.

A spline shaft 50 extending from the front differential 40 is inserted in the end of the input shaft 14, so that the rotation of the differential 40 in either direction can be transmitted without delay to the input shaft 14.

Engaging surfaces 15 and 16 are formed on the outer peripheral surface of the input shaft 14 and the inner peripheral surface of the outer ring 6, respectively. Provided between the engaging surfaces 15 and 16 are a rotatable control cage 17 and a fixed cage 18 pinned to the input shaft 14.

Figure 2:
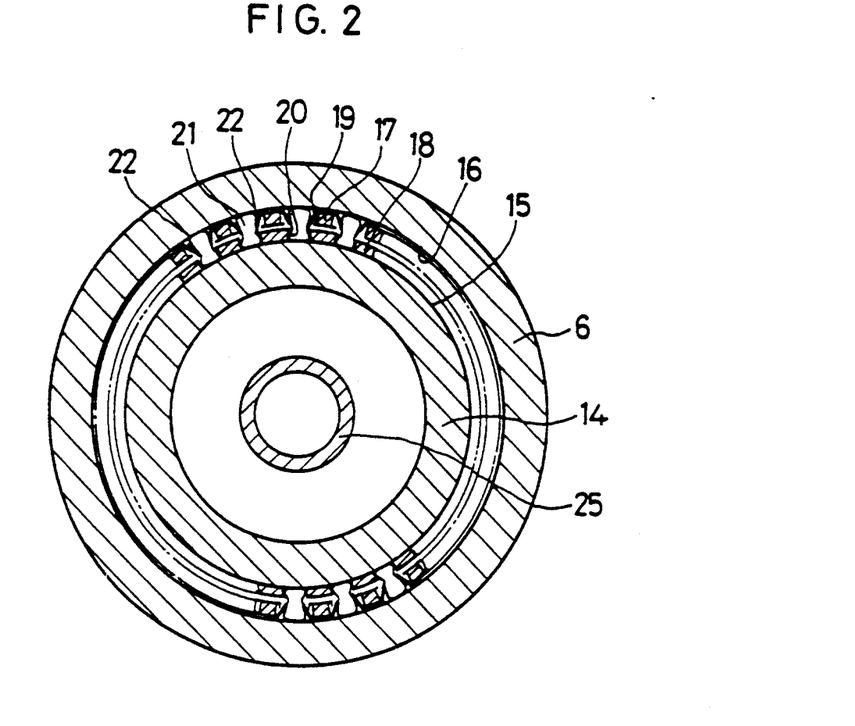
FIG. 2 is a sectional view taken along line II—II of FIG. 1.

As shown in FIG. 2, a plurality of pockets 19 and 20 are formed in an opposed manner in the control cage 17 and the fixed cage 18, respectively. In each pair of the pockets 19 and 20, a sprag 21 as an engaging element and elastic members 22 are provided.

Figure 4:
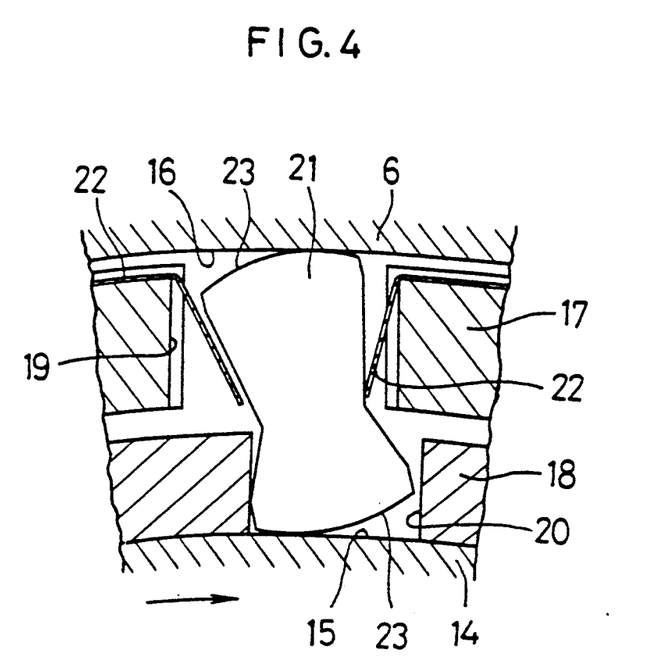
FIG. 4 is a sectional view showing an operative state of the sprags of the same.

As shown in FIG. 4, the sprags 21 have outer and inner arcuate surfaces having their centers of curvature located on the centerline of each sprag. When they are inclined a predetermined angle either clockwise or counterclockwise, they will engage the engaging surfaces 15 and 16, thus coupling the input shaft 14 and the outer ring 6 together. The elastic members 22 have one of their ends supported on the control cage 17 and the other abutting the sprags 21 to urge them from both ends, thus keeping the sprags in their neutral position where they are out of engagement with the engaging surfaces 15 and 16.

On the other hand, a control shaft 25 is rotatably supported in the input shaft 14 through bearings 24. A pin 26 coupled to the center of the control shaft 25 extends through pin holes 27 formed in the input shaft 14 and is coupled to the control cage 17.

A pin 28 coupled to the rear end of the control shaft 25 extends through pin holes 29 formed in the input shaft 14 and is coupled to a differential means 30, which comprises a rolling bearing 31 and a support arm 32 through which the bearing 31 is supported on a stationary member of the vehicle body. The bearing 31 is fitted in the support arm 32 with a pre-load greater than a predetermined value so that the radial gap therebetween will be zero or less. With this arrangement, the bearing 31 offers a greater resistance to rotation when rolling than the bearings 12 and 13 supporting the input shaft 14.

The resistance to rotation offered by the rolling bearing 31 serves to restrain the rotation of the control shaft 25 and the control cage 17, so that the latter will be decelerated with respect to the rotation of the input shaft 14 and will not rotate easily by shocks or inertia.

Figure 3:
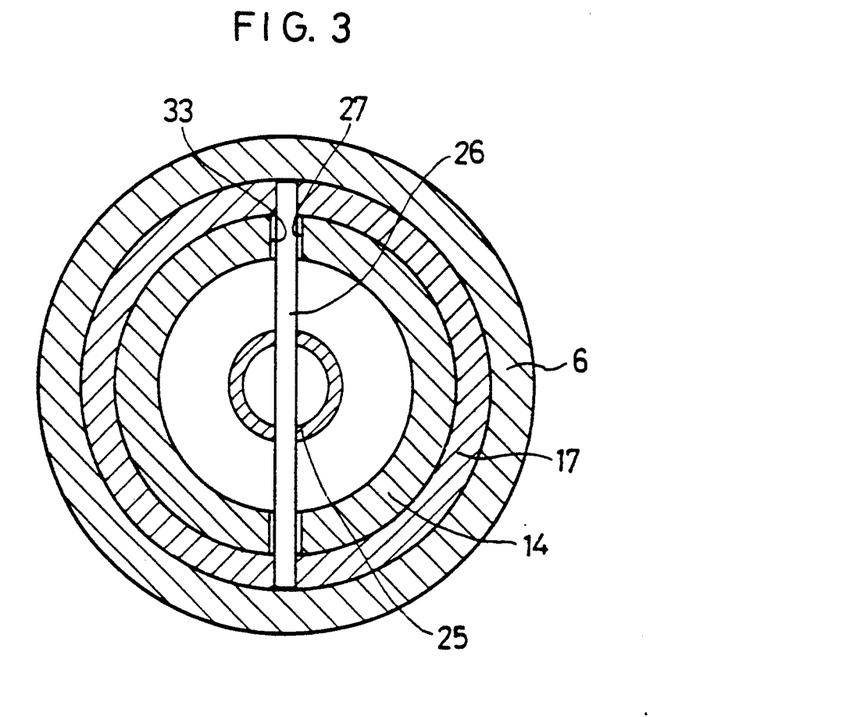
FIG. 3 is a sectional view taken along line III—III of FIG. 1.

As shown in FIG. 3, the pin 26 coupled to the central part of the control shaft 25 is fixedly coupled to the control cage 17 and loosely fitted in the pin holes 27 in the input shaft 14 with gaps 33 defined therebetween in the direction of rotation. Between a pin 28 coupled to the rear end of the control shaft 25 and the pin holes 29 in the input shaft 14, circumferential gaps are provided which are larger than the gaps 33 extending in the direction of rotation.

The angle of delay of the control cage 17 with respect to the input shaft 14 is determined by the gaps 33 provided in the direction of rotation. The size of gaps 33 is determined so as to be greater than the distance by which the sprags 21 move from their neutral position between the engaging surfaces 15 and 16 till they contact the engaging surfaces through the elastic members 22.

In operation, when torque is applied to the input shaft 14 from the front differential 40, the control cage 17 is decelerated by the differential means 30 and thus its rotation is retarded with respect to the input shaft 14 by a distance equal to the size of the gaps 33 in the direction of rotation. In other words, the control cage 17 rotates relative to the fixed cage 18. By this relative rotation between the two cages, the sprags 21 will incline as shown in FIG. 4 in a direction opposite to the direction in which the input shaft 14 rotates (shown by arrow) and come in contact with the engaging surfaces 15 and 16. This is the engaged operative state.

When the sprags 21 are inclined, all the sprags will move to the engaged operative state before the pin 26 contacts the wall of the pin holes 27 since the sprags 21 are always urged by the elastic members 22 mounted on the control cage 17. In this state, the input shaft 14 and the control cage 17 rotate together.

As the input shaft 14 keeps rotating from this state the sprags 21 will engage the engaging surfaces 15 and 16.

Now the clutch is on. In this state, the driving force of the input shaft 14 is transmitted to the sheath 4 through the sprags 21 and then to the axle 43 through the homokinetic joint 2. When the driving force is thus transmitted to one of the axles 43, it is transmitted to the other axle 44, too, through the side gears 48 of the front differential 40. Thus all the four wheels are driven.

When the car is running straight, since the rear wheels and the front wheels rotate together, the front differential 40 and the axle 43 are supposed to be rotating at the same speed. But actually, the vehicle speed is slightly lower than rear wheel speed due to slipping between the rear wheels and the road surface, so that the front differential 40 rotates slightly faster than the front wheels and the axle 43. Thus, while the vehicle is running straight, the clutch is on, i.e. the front wheels are driven and thus all the four wheels are driven.

In contrast, when the car is turning a tight corner, (the front wheels rotate faster than the rear wheels), so that the axle 43 rotates faster than the input shaft 14, allowing the outer ring 6 to overrun the sprags 21. Thus, a tangential force is applied by the outer ring 6 to the sprags 21 in such a direction as to disengage the sprags 21 from the engaging surfaces 15 and 16. The clutch is now cut off and the input shaft 14 and the axle 43 are disengaged from each other. When the resistance to rotation exerted on the input shaft 14 disappears and one of the axles 43 begins to idle, the driving force from the front differential 40 is not transmitted to the other axle 44. In this state, the motion of the front wheels 41 and 42 is not restricted by the front differential 40, so that no braking will occur due to the difference in revolving speed between the front and rear wheels while the car is turning a tight corner. Further, during the two-wheel drive mode, i.e. while only the rear wheels are driven, if one of the rear wheels should lose grip of the road surface or should slip while the car is turning a tight corner, the vehicle speed will drop, so that the front differential 40 begins to rotate faster than the front wheels decelerating and thus the input shaft 14 rotates faster than the sheath 4. This causes the sprags 21 to engage the engaging surfaces 15 and 16. The driving force is now transmitted to the front wheels and the vehicle is driven by the front wheels.

If one of the front wheels should lose grip of the road surface, while all the four wheels are being driven the front differential 40 comes into action, thus completely shutting off the transmission of driving force to the axle carrying the wheel gripping the road surface. In this state, though the driving force is not transmitted to the front wheels 41 and 42 effectively, the vehicle can keep moving driven by the rear wheels.

On the other hand, if the moving direction of the vehicle changes and the front differential 40 rotates in the opposite direction. the input shaft 14 and the control cage 17 will also rotate in reverse, so that the sprags 21 will engage the engaging surfaces 15 and 16 at positions opposite to the positions shown in FIG. 4. Thus, the drive mode can be changed over in exactly the same way when the vehicle is running either forward or backward.

According to this invention, if one of the rear wheels or one of the front wheels should slip or lose grip of the road surface, the drive mode is automatically changed over to two-wheel drive to keep the vehicle moving. If the front wheels begin to rotate faster than the rear wheels while the car is turning a tight corner, the clutch will overrun, thus separating the front and rear wheels from each other. In other words, the device of this invention has both the differential locking function and the function of absorbing differences in revolving speed and makes possible a full-time direct-coupled four-wheel drive without the need of any complicated center differential such as a viscous coupling or a coupling utilizing a multiple disc clutch.

SECOND EMBODIMENT

Figure 7:
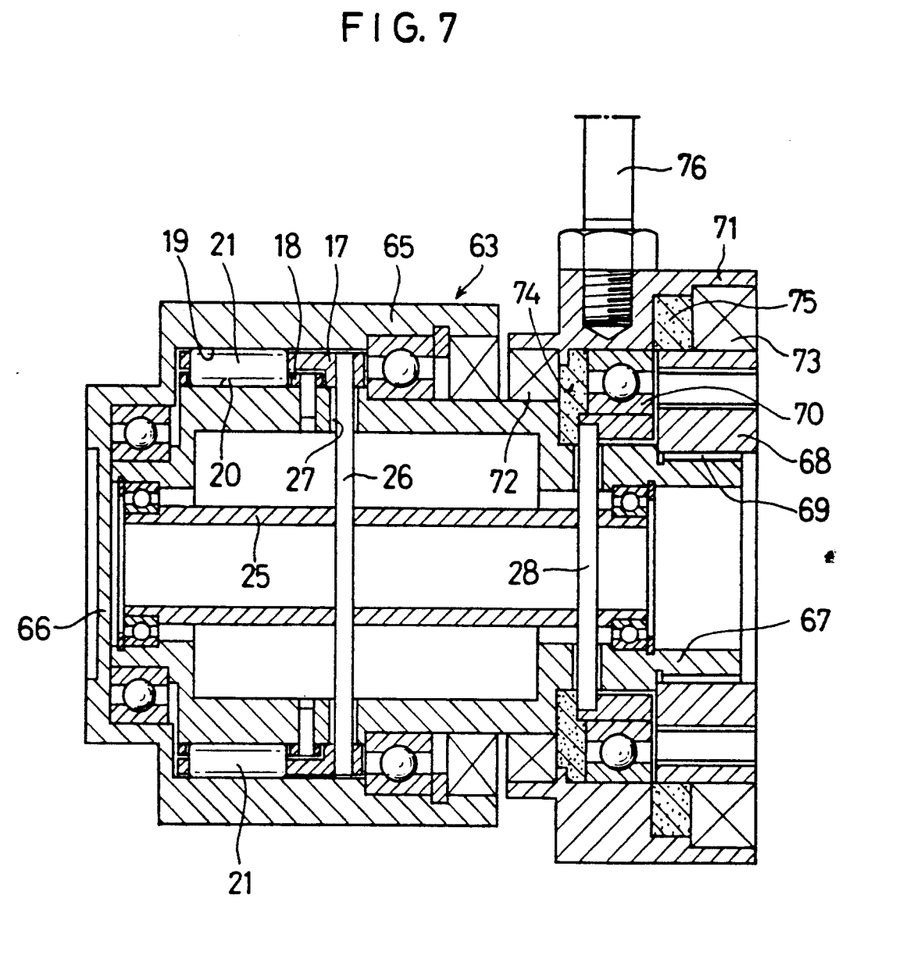
FIG. 7 is a vertical sectional front view of a second embodiment.
Figure 8:
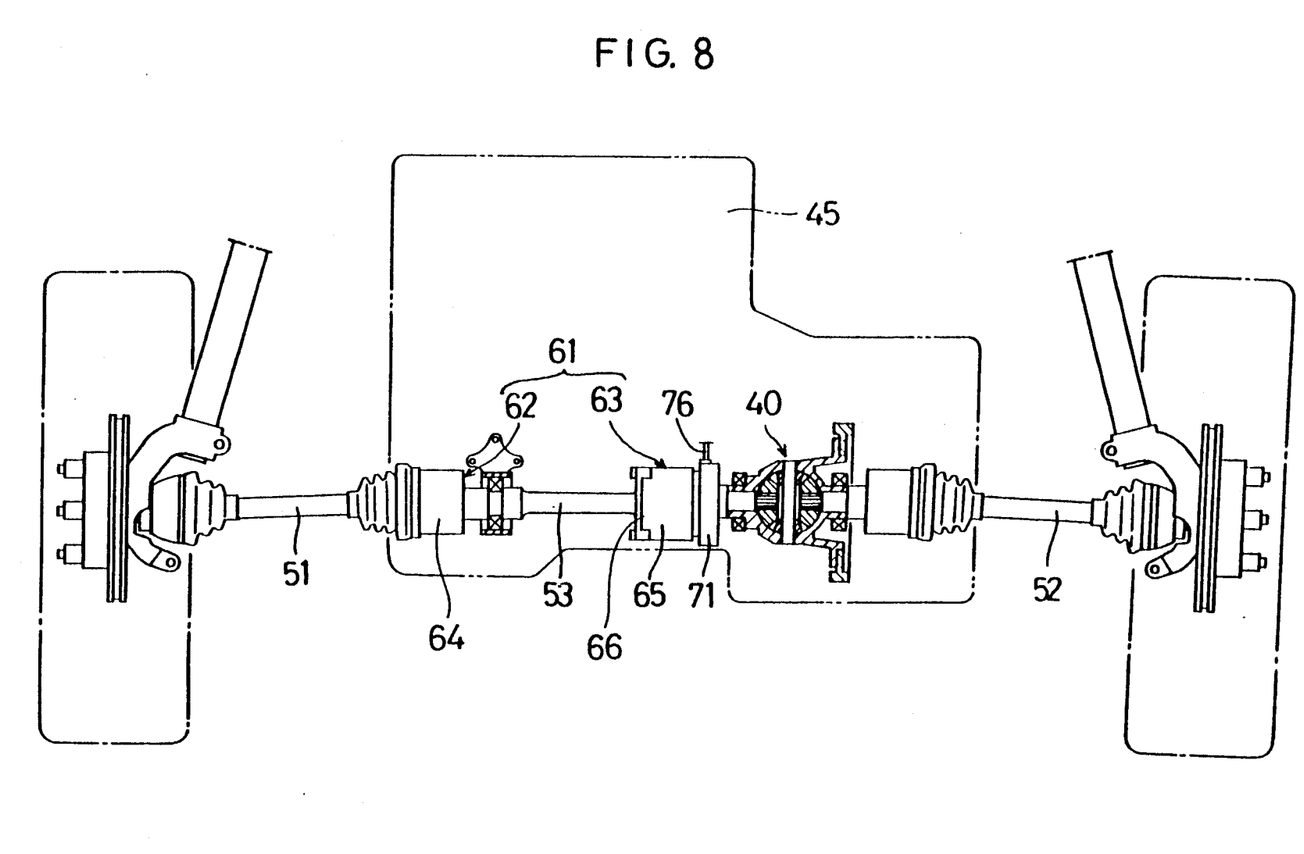
FIG. 8 is a partially vertical sectional front view of the same mounted on the driving system of a vehicle.

FIG. 7 shows a clutch device of a second embodiment. FIG. 8 shows the same mounted on the drive system of a vehicle.

The driving structure shown in FIG. 8 includes the front differential 40, a center shaft 53 provided between the front differential and one of two axles. The two axles 51 and 52 have the same length. A clutch device 63 is mounted on the center shaft 53 having a balanced torsional rigidity.

In this embodiment, a driving force transmission device 61 comprises a homokinetic joint 62 coupled to the end of the axle 51 and the clutch device 63 which is separate from the joint 62 and coupled to the center shaft 53. Outer rings 64 and 65 of these two members are coupled together through the center shaft 53.

This clutch device 63 is basically the same in structure as the clutch device 3 of the first embodiment. Thus like parts are denoted like numerals and their description is omitted. This clutch device differs from that in the first embodiment only in that it has a totally sealed structure to keep off water and mud.

Namely, the outer ring 65 of the clutch device 63 has its one end sealed by an end wall 66. The center shaft 53 is coupled to this end by means of bolts or the like. An input flange member 68 adapted to be coupled to the front differential 40 is coupled to the outer periphery of an input shaft 67 at its end by means of splines 69. The flange member 68 and a rolling bearing 70 which produces resistance to rotation are enclosed in a metal case 71 which serves as a support arm for the differential means. The metal case 71 is provided with a coupling means 76 for coupling to an external stationary member.

Axial seals 72 and 73 are provided between the metal case 71 and the input shaft 67 and between the metal case 71 and the flange member 68, respectively. Inside the respective axial seals 72 and 73, seal members 74 and 75 which withstand a high peripheral speed are provided.

The homokinetic joint 62 and the clutch device 63 are usually mounted on the axles, partially exposed through the bottom of the vehicle. Thus, while the car is travelling, water, mud or dust may infiltrate inside. Especially when the car is travelling off the road, these members may be hit hard by earth, sand or stones.

In order to cope with such harsh conditions, the clutch device 63 shown in FIG. 7 is covered entirely with the outer ring 65 and the metal case 71 and the axial seals and seal members are added to provide a totally sealed structure. This structure can prevent almost perfectly the infiltration of foreign matter and can withstand the collision with earth, sand and stones, so that the device can maintain high performance stably.

In the above embodiment, although the differential means 30 for decelerating the control cage 17 through the control shaft 25 is coupled to the control cage 17, it may be coupled to the input shaft side. In this case, in the clutch device 63 shown in FIG. 7, gaps extending in the direction of rotation are provided between the splines 69 for coupling the input shaft 67 and the flange member 68 together; the flange member 68 and the control shaft 25 are coupled together; the control cage 17 is provided inside the fixed cage 18; the rolling bearing 70 for imparting resistance to rotation is coupled to the input shaft 67 to retard the rotation of the input shaft 67 with respect to the control cage 17. With this arrangement, the sprags 21 can be held in the engaged operative state shown in FIG. 4.

In the embodiments, the differential means is shown to be a rolling bearing for imparting resistance to rotation but is not limited thereto. It may be a speed reducing mechanism using gears or a brake mechanism adapted to be decelerated by sliding contact with a friction member.

Further, in the above embodiments, we showed the sprags 21 which are engageable when inclined either clockwise or counterclockwise. But sprags engageable in one direction only may be used in pairs. Also engaging members may be rollers.

What is claimed is:

1. A driving force transmission device for a vehicle comprising a homokinetic joint having an outer ring and a clutch means having an outer ring, said outer rings being coupled together, said clutch means further comprising an input shaft rotatably inserted in said outer ring of said clutch means, a cage rotatably mounted between opposed surfaces of said outer ring and said input shaft of said clutch means, said cage being formed with pockets, engaging elements mounted in said pockets and adapted to engage said opposed surfaces when said input shaft and said cage rotate relative to each other either clockwise or counterclockwise and to disengage from said opposed surfaces when the rotating speed of the outer ring becomes higher than that of the input shaft, elastic members mounted in said pockets and adapted to keep said engaging elements in a position where said engaging elements are not in engagement with said opposed surfaces, said cage and said input shaft being coupled together with a gap extending in a direction of rotation formed therebetween so as to be rotatable together, and a resistance providing means mounted on one of said cage and said input shaft to produce a difference in rotation therebetween so that the rotation of said cage will be slower than the rotation of said input shaft.

2. A driving force transmission device as claimed in claim 1, wherein said outer ring of said homokinetic joint and said outer ring of said clutch means are integral with each other.

* * * * *